United States Patent
Winkler et al.

(10) Patent No.: US 10,348,117 B2
(45) Date of Patent: Jul. 9, 2019

(54) ANTENNA CONFIGURATION CHANGE BASED ON CHARGING PAD COUPLING

(71) Applicant: MOTOROLA MOBILITY LLC, Chicago, IL (US)

(72) Inventors: David A. Winkler, Aurora, IL (US); Wayne Ballantyne, Coconut Creek, FL (US); Eric L. Krenz, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 190 days.

(21) Appl. No.: 14/872,725

(22) Filed: Oct. 1, 2015

(65) Prior Publication Data

US 2017/0098953 A1 Apr. 6, 2017

(51) Int. Cl.
*H02J 7/04* (2006.01)
*H02J 7/02* (2016.01)
*H02J 50/10* (2016.01)

(52) U.S. Cl.
CPC .............. *H02J 7/025* (2013.01); *H02J 50/10* (2016.02)

(58) Field of Classification Search
CPC .. H02J 7/025; H02J 50/90; H02J 50/20; H02J 50/80; H02J 50/23; H02J 50/27; H02J 50/40; H04W 4/021; H04B 5/0037; H04B 7/026
See application file for complete search history.

(56) References Cited

U.S. PATENT DOCUMENTS

| | | | |
|---|---|---|---|
| 2014/0203758 A1* | 7/2014 | Moshfeghi | H02J 7/025 320/103 |
| 2014/0206406 A1* | 7/2014 | Cordeiro | H04W 72/046 455/501 |
| 2014/0292090 A1* | 10/2014 | Cordeiro | H02J 17/00 307/104 |
| 2015/0011160 A1* | 1/2015 | Jurgovan | H04B 5/0031 455/41.1 |
| 2015/0015419 A1* | 1/2015 | Halker | B60L 11/1827 340/901 |

(Continued)

OTHER PUBLICATIONS

Jian Qiao, etal.: "Enabling device-to-device communications in millimeter-wave 5G cellular networks", Communications Magazine, IEEE (vol. 53, Issue: 1), Jan. 2015, pp. 209-215.

(Continued)

*Primary Examiner* — Dong-Chang Shiue
(74) *Attorney, Agent, or Firm* — Loppnow & Chapa; Matthew C. Loppnow

(57) ABSTRACT

An apparatus, such as a user device, can comprise a battery, a plurality of antennas, a transceiver, a charging pad interface, and a controller. The battery can be configured to power the user device. The plurality of antennas can be configured to send and receive signals to and from a wireless node. The transceiver can be configured to communicate, via the plurality of antennas, with the wireless node. The charging pad interface can be configured to detect that the apparatus is coupled to a charging pad and to receive charging power from the charging pad. The controller can be configured to change a configuration of at least one antenna from the plurality of antennas in response to the charging pad interface detecting that the apparatus is coupled to the charging pad.

23 Claims, 6 Drawing Sheets

(56) References Cited

U.S. PATENT DOCUMENTS

2015/0045091 A1* 2/2015 Nakatani .............. H04B 5/0031
                                                                               455/556.1

OTHER PUBLICATIONS

Yang, L.L., et al: "Applications and Challenges of Multi-band Gigabit Mesh Networks", Sensor Technologies and Applications, 2008. SENSORCOMM '08. Second International Conference, Aug. 25-31, 2008, pp. 813-818.

Hong, Wonbin et al.: "Study and Prototyping of Practically Large-Scale mmWave Antenna Systems for 5G Cellular Devices", Communications Magazine, IEEE (vol. 52, Issue: 9, Sep. 2014, pp. 63-69.

Taori, R.; Sridharan, A.: "Point-to-multipoint in-band mmwave backhaul for 5G networks", Communications Magazine, IEEE (vol. 53, Issue:1), Jan. 2015, pp. 195-201.

Gentile, C. et al: "Wireless network deployment in the smart grid: Design and evaluation issues", Network, IEEE vol. 26, Issue:6), Nov.-Dec. 2012, pp. 48-53.

Jeong, Cheol et al: "Random access in millimeter-wave beamforming cellular networks: issues and approaches", Communications Magazine, IEE (vol. 53, Issue:1), Jan. 2015, pp. 180-185.

\* cited by examiner

ANTENNA CONFIGURATION CHANGE BASED ON CHARGING PAD COUPLING

BACKGROUND

1. Field

The present disclosure is directed to a method and apparatus for changing a configuration of at least one antenna from a plurality of antennas. More particularly, the present disclosure is directed to changing a configuration of at least one antenna from a plurality of antennas when a user device is detected as being coupled to a charging pad.

2. Introduction

Some user devices employ a type of battery charging called inductive charging. Inductive charging employs a charging primary which is connected to a power source, such as an electrical outlet, and a charging secondary within a user device. The charging primary and the charging secondary each employ a coil. Power is wirelessly transferred from the charging primary to the user device via the two respective coils therein.

The charging primary is commonly called a charging pad. A charging pad allows the user device to be wirelessly charged by simply placing the user device on the charging pad. Charging pads are being employed in various public places (for example, airports, fast food restaurants, coffee shops, libraries, etc.). Charging pads are being employed by commercial establishments as a value add to draw more customers to their location and to keep those customers at their location for a longer time. Charging pads are integrated into stationary objects at public places, such as tables or charging stations.

Charging pads can receive a unique identifier of a particular user device when the particular user device is placed on the charging pad. Such an identifier can be transmitted to a monitoring station. The monitoring station can record how often a particular user device frequents a particular public place and how long the particular user device remains at the particular public place. Such information can be employed by a commercial establishment as a basis for performing market analysis, adjusting aesthetics within their establishment, arrange furniture within their establishment for maximum benefit, and/or any other reason that will provide a commercial benefit to the establishment.

Charging pads have the capability to uniquely identify themselves to a monitoring system. Because charging pads in public places are integrated into stationary objects, a location of the charging pad and a particular user device within the public places is known. Commercial establishments can use such information as a basis to monitor customer locations within their establishments.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

There is a need for a method and apparatus that can configure a user device when the user device is coupled to a wireless charging pad. Such a configuration can include a change in configuration of at least one antenna of the user device. The change in configuration can allow the user device to be more energy efficient while establishing a link to a wireless network, thereby reducing power consumption of the user device and decreasing the time needed to establish such a link. Such a reduction in power consumption can in turn allow for faster charging of the user device when coupled to the charging pad.

There is a need for a method and apparatus that can configure a wireless node servicing a user device when the user device is coupled to a wireless charging pad. Such a configuration can include a change in configuration of at least one antenna of the wireless node. The change in configuration can allow the wireless node to more quickly establish initial communications with the user device. The change in configuration can allow the wireless node to be more energy efficient thereby reducing power consumption of the wireless node, while also improving the link margin to the user device, which allows for higher data throughput.

Embodiments can provide for a method and apparatus, such as a user device, comprising a battery, a plurality of antennas, a transceiver, a charging pad interface, and a controller. The battery can be configured to power the user device. The plurality of antennas can be configured to send and receive signals to and from a wireless node. The transceiver can be configured to communicate, via the plurality of antennas, with the wireless node. The charging pad interface can be configured to detect that the apparatus is coupled to a charging pad and to receive charging power from the charging pad. The controller can be configured to change a configuration of at least one antenna from the plurality of antennas in response to the charging pad interface detecting that the apparatus is coupled to the charging pad.

Embodiments can provide for a method and an apparatus, such as a wireless node, comprising a plurality of antennas, a transceiver, and a controller. The plurality of antennas can be configured to send and receive signals to and from a user device. The transceiver can be configured to communicate, via the plurality of antennas, with the user device. The controller can be configured to change a configuration of at least one antenna from the plurality of antennas in response to the apparatus detecting that the user device is coupled to a charging pad.

Figure 1:
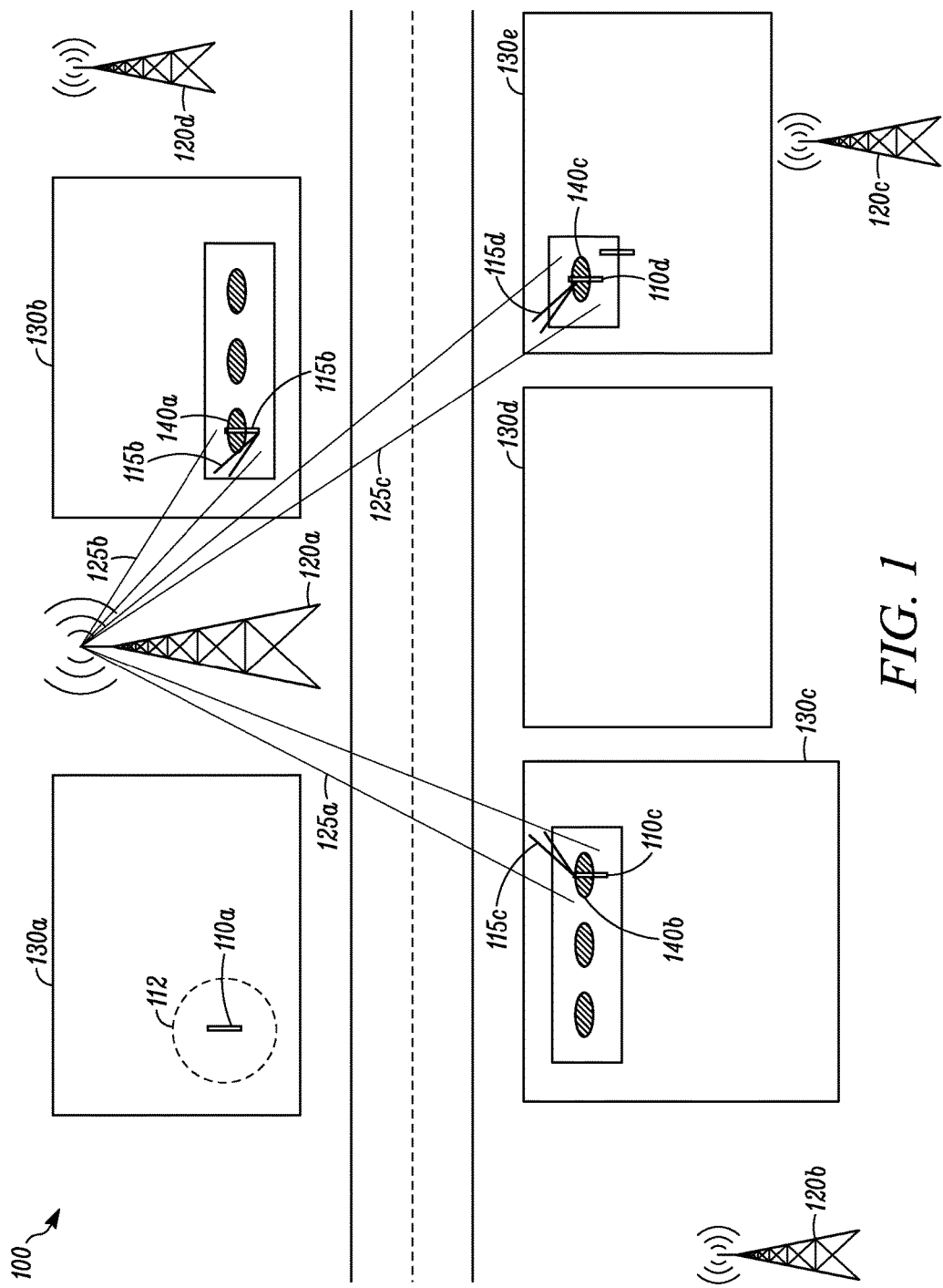
FIG. 1 illustrates a diagram of an example system, according to one or more embodiments.

FIG. 1 illustrates a diagram of an example system 100, according to one or more embodiments. The system 100 can include a plurality of user devices 110a-d, a plurality of wireless nodes 120a-d, a plurality of stationary charging pads 140a-c, and a plurality of buildings 130a-e.

The buildings 130 can include such buildings as residences, merchants, public spaces, libraries, office buildings, restaurants, or any other building that can host a charging pad 140. For example, building 130a can represent a residence building, building 130b can represent a merchant building, building 130c can represent a public space building, building 130d can represent another merchant building, and building 130e can represent another residence building. Buildings 130b, 130c, and 130e can host one or more charging pads 140, while buildings 130a and 130d can lack a charging pad 140.

The user devices 110 can be wirelessly charged by placing the user devices 110 on the charging pads 140. The user devices 110 can establish wireless communications with the charging pads 140 and obtain a unique charging pad identifier associated with a particular charging pad 140. The user devices 110 can establish wireless communications with the charging pads 140 as a basis for connecting with a local network. For example, user device 110b can be charged when placed on charging pad 140a, user device 110c can be charged when placed on charging pad 140b, and user device 110d can be charged when placed on charging pad 140c. User device 110a is located within building 130a that lacks a charging pad 140.

The user devices 110 can establish wireless communications with the wireless nodes 120. The user devices 110 and the wireless nodes 120 can establish communications using mmWave bands (for example, 28 GHz, 38 GHz, 60 GHz, 70 GHz, or any other frequency band employing a plurality of antennas and utilizing beamforming), an 802.11 standard, such as 802.11 ad, and/or any other standard providing for beamforming. The user devices 110 can apply beamforming to optimize wireless communications with the wireless nodes 120. The user devices 110 can obtain an a priori location of the wireless nodes 120 as a basis for applying beamforming when the user device 110 is placed on the charging pad 140. For example, user device 110b can obtain a location of wireless node 120a, and applying beamforming to form beam 115b when the user device 110b is placed on the charging pad 140a. User device 110c can obtain a location of the wireless node 120a, and applying beamforming to form beam 115c when the user device 110c is placed on the charging pad 140b. User device 110d can obtain a location of wireless node 120a, and applying beamforming to form beam 115d when the user device 110d is placed on the charging pad 140c. User device 110a can lack an ability to obtain a location of any of the wireless nodes 120a-c and therefore performs an undirected initial scan 112 to initially establish communications with the one or more nearby wireless nodes 120a-c. This undirected initial scan 112 consumes additional power within the user device 110 than establishing communications between the user device 110 and the wireless node 120 based on a location of the user device 110 or an a priori location the charging pad 140, and an a priori location of the wireless node 120.

The charging pads 140 can be wirelessly coupled to the user devices 110. The charging pads 140 can wirelessly charge the user devices 110. The charging pads 140 can charge the user devices 110 via inductive charging. The charging pads 140 can obtain unique user device 110 identifiers associated with particular user devices 110. The charging pads 140 can be integrated into such stationary objects as tables, lamps, chairs, charging station, or any other object that is stationary.

The charging pads 140 can employ an established wireless charging protocol or a non-standard charging protocol. In one or more embodiments, the charging pads 140 can employ at least one of the Qi standard and/or the Power Matters Alliance (PMA) standard.

The wireless nodes 120 can receive location information detailing the location of the user devices 110 and/or the charging pads 140. Each of the charging pads 140a-c can be associated with an a priori stationary geographic location. The wireless nodes 120 can apply beamforming to optimize wireless communications with the user devices 110. The wireless nodes 120 can apply beamforming to optimize wireless communications with the user devices 110 when the user devices 110 are located at these stationary geographic locations. Such beamforming by the wireless nodes 120 can save power versus undirected scanning for user devices 110, providing for more precise radio frequency (RF) aiming and reduced scan and network acquisition times.

One or more of the wireless nodes 120a-d can be selected to service the user devices 110b-d based on a stationary geographic location of the user devices 110b-d. Such selection of the wireless nodes 120b-d can result in a reduced paging block size based on knowledge of which wireless nodes 120a-d will service the user devices 110b-d and allows for optimized bandwidth allocation for the wireless nodes 120a-d. For example, the wireless node 120a can be selected to service the user devices 110 b-d. The wireless node 120a can apply beamforming to form beam 125a to optimize wireless communications with the user device 110c when the user device 110c is initially placed on the charging pad 140b. The wireless node 120a can apply beamforming to form beam 125b to optimize wireless communications with the user device 110b when the user device 110b is initially placed on the charging pad 140a. The wireless node 120a can apply beamforming to form beam 125c to optimize wireless communications with the user device 110d when the user device 110d is initially placed on the charging pad 140c.

Figure 2:
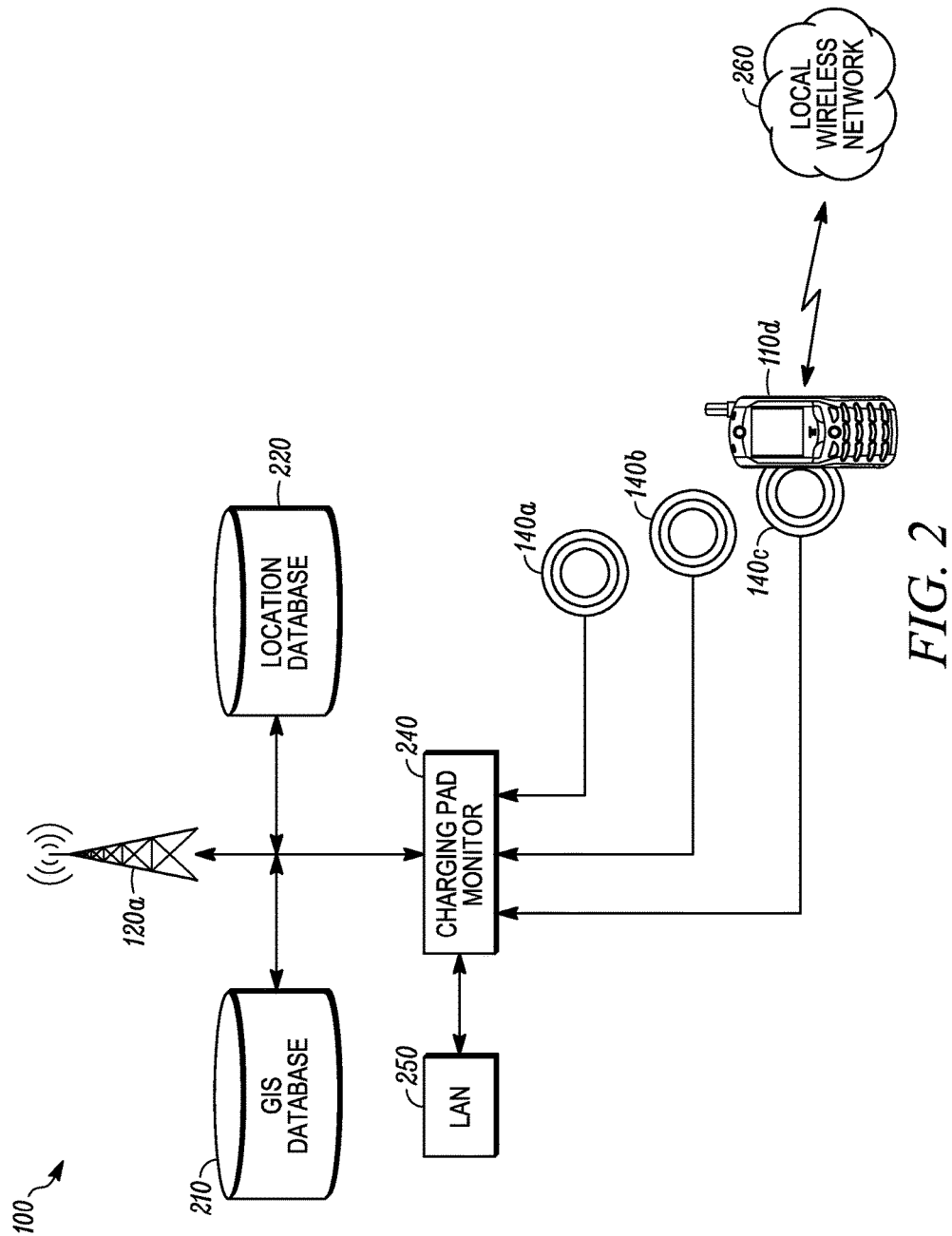
FIG. 2 illustrates a detailed view of the example system, according to one or more embodiments.

FIG. 2 illustrates a detailed view of the example system 100, according to one or more embodiments. The system 100 can further include a geographic information system (GIS) database 210 coupled to the wireless node 120a, a location database 220 coupled to the wireless node 120a, and a charging pad monitor 240 coupled to the wireless node 120a. The charging pad monitor 240 can be further coupled to the charging pads 140a, 140b, and 140c, which could also represent separate wireless charging coils within the same physical charging pad 140. In one or more embodiments, the wireless node 120a can be coupled to the GIS database 210, and the location database 220, via the Internet. The charging pads 140 can be coupled, via the charging pad monitor 240, to the local area network (LAN) 250 using a wireless or wired connection. Although only wireless node 120a is illustrated for simplification, wireless nodes 120b-d can be configured the same as wireless node 120a.

The GIS database 210 can store location information associated with each of the user devices 110. The GIS database 210 can store the location information with an accuracy that allows the wireless node 120a to apply beamforming to form a beam 115 pointing at a location of a particular user device 110. For example, the GIS database 210 can store the location information with accuracy within 1 meter of where the user device 110 is located.

The GIS database 210 can store a unique identifier associated with a particular charging pad 140. The GIS database 210 can store a priori location information associated with each of the charging pads 140. For example, the GIS database 210 can store location information indicating an a priori location of the charging pad 140a, 140b, and 140c, such location information associated with unique identifiers associated with each of the charging pads 140a-c, respectively. The location information associated with unique identifiers and associated with the charging pads 140 can be entered into the GIS database 210 when the charging pads 140a-c are initially installed at stationary locations within the buildings 130b, 130c, and 130e. The GIS database 210 can store the location information for the charging pads 140 with accuracy within 1 meter of where the charging pads 140 are located.

The charging pad monitor 240 can receive a unique identifier associated with a particular charging pad 140. The charging pad monitor 240 can receive a unique identifier associated with a particular user device 110, via the charging pad 140. The charging pad monitor 240 can receive the unique identifier associated with a particular charging pad 140 and/or the unique identifier associated with a particular user device 110 when the user device 110 is initially placed on the charging pad 140. The charging pad monitor 240 can store the unique identifier associated with a particular charging pad 140 and/or the unique identifier associated with a particular user device 110 in the location database 220. For example, the charging pad monitor 240 can receive a unique identifier associated with the charging pad 140c and/or a unique identifier associated with the user device 110d when the user device 110d is initially placed on the charging pad 140c.

The location database 220 can provide a point of access for the wireless node 120a to access location information needed to apply beamforming. The location database 220 can store location information associated with the charging pad 140 and/or the user device 110 when the user device 110 is initially placed on the charging pad 140. The location database 220 can be updated with a location of the user device 110 when the user device 110 is placed on the charging pad 140. In one or more embodiments, the wireless node 120a can update the location database 220 with location data retrieved from the GIS database 210. For example, the location database 220 can store an a priori location of the charging pad 140c and/or the location of the user device 110d when the user device 110d is initially placed on the charging pad 140.

The wireless node 120a can receive, from the charging pad monitor 240, a unique identifier associated with a particular charging pad 140 and/or a unique identifier associated with a particular user device 110 when the particular user device 110 is placed on the particular charging pad 140. The wireless node 120a can use the unique identifier associated with the particular charging pad 140 and/or a unique identifier associated with the particular user device 110 as a basis for querying the location database 220 and/or the GIS database 210. The wireless node 120 can apply beamforming in a direction of a location associated with location information retrieved from the location database 220 and/or the GIS database 210. For example, wireless node 120a can receive, from the charging pad monitor 240, a unique identifier associated with the charging pad 140c and/or a unique identifier associated with the user device 110d when the user device 110d is placed on the charging pad 140c. The wireless node 120a can apply beamforming in the direction of a location of the charging pad 140c and the user device 110d retrieved from the location database 220 and/or the GIS database 210.

In one or more embodiments, a user device 110 can receive a unique identifier associated with a charging pad 140 when the user device 110 is placed on the charging pad 140. The user device 110 can transmit, to one or more wireless nodes 120, a status update indicating that the user device 110 has coupled to a charging pad 140. The status update can include the unique identifier associated with the charging pad 140 and a unique identifier associated with the user device 110, or the unique identifier associated with the charging pad 140 and location information determined by the user device 110 (for example, global positioning system (GPS) location information). The user device 110 can transmit the status update over a cellular communication network, the LAN 250, and/or the local wireless network 260 to the one or more wireless nodes 120. A wireless node 120 can query the GIS database 210 and/or the location database 220 with the unique identifier associated with the charging pad 140 and/or the unique identifier associated with the user device 110 transmitted by the user device 110 to determine a location of the user device 110 and the charging pad 140. The wireless node 120 can apply beamforming in a direction of the location of the user device 110 and the charging pad 140 based on the location retrieved from the location database 220 and/or the GIS database 210.

In one or more embodiments, the wireless node 120a can "learn" a location of the charging pads 140 and update the GIS database 210. The wireless node 120a can receive a unique identifier associated with a particular charging pad 140 when the user device 110 is placed on the charging pad 140. The wireless node 120a and the user device 110 can establish communications and each apply beamforming to optimize communications between them. The wireless node 120a can determine and apply weights to each of a plurality of antennas used to apply the beamforming at the wireless node 120a, the weights associated with a transmission power applied to each of the plurality of antennas when communicating with a particular user device 110 when placed on the charging pad 140. The weights for each of the plurality of antennas can be recorded in the GIS database 210. For each subsequent user device 110 placed on the charging pad 140, additional weights can be determined and applied by the wireless node 120a. The wireless node 120a can reconcile the plurality of weights determined and applied by the wireless node 120a to build the GIS database 210 over the course of time, when the particular charging pad 140 charges a plurality of user devices 110. The wireless node 120a can use the GIS database 210 built over time with the weights to initially apply beamforming based on the recorded weights when the user device 110d is initially placed on the charging pad 140c. In one or more embodiments, a plurality of wireless nodes 120 can record weights for a particular charging pad 140 in the GIS database 210 as a basis for determining a location of the particular charging pad 140 utilizing triangulation.

Figure 3:
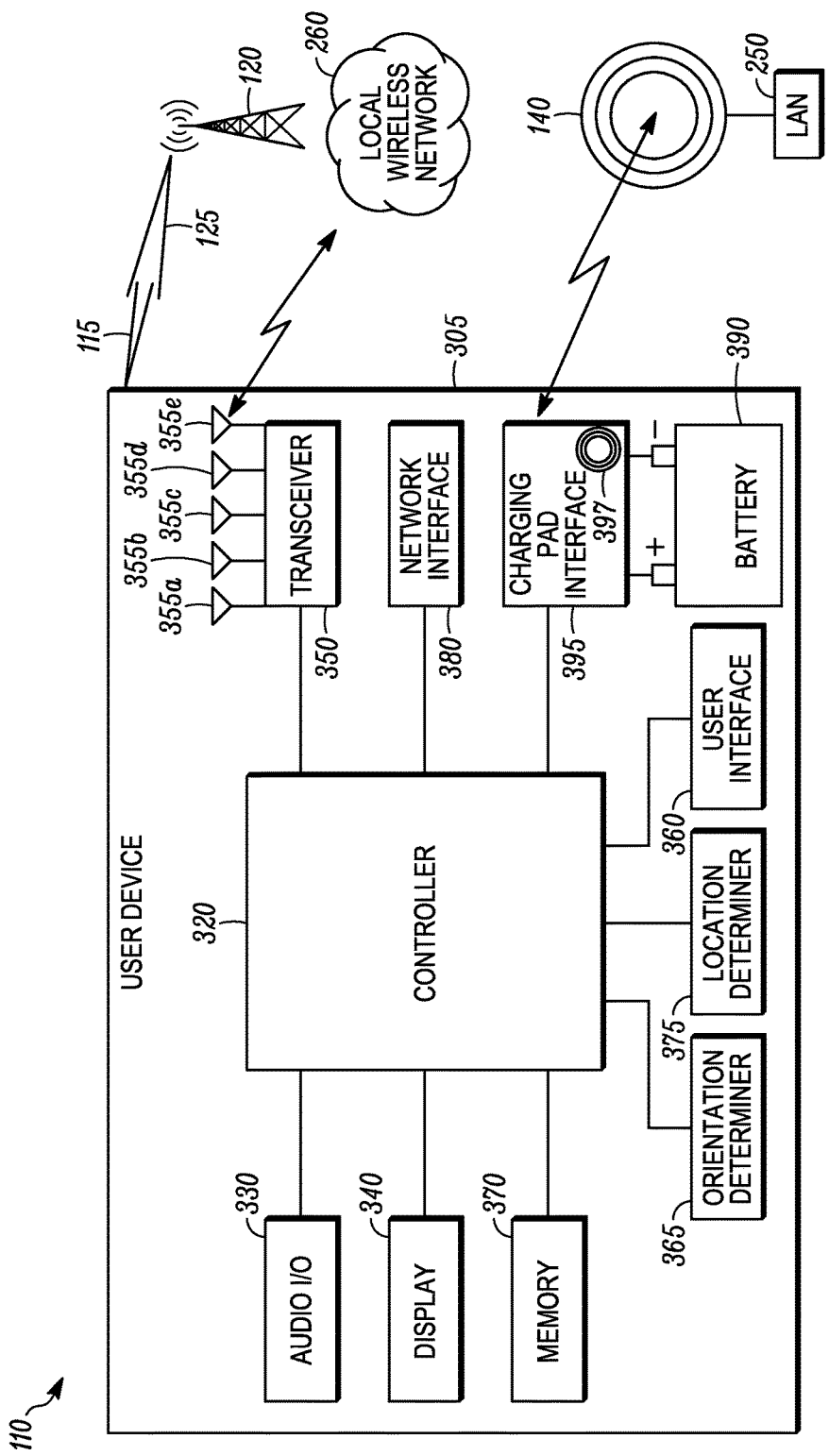
FIG. 3 illustrates a block diagram of an example user device, according to one or more embodiments.

FIG. 3 illustrates a block diagram of an example user device 110, according to one or more embodiments.

The user device 110 can include a housing 305, a controller 320 within the housing 305, a battery 390, audio input and output circuitry 330 coupled to the controller 320, a display 340 coupled to the controller 320, a transceiver 350 coupled to the controller 320, a plurality of antennas 355a-e coupled to the transceiver 350, a user interface 360 coupled to the controller 320, an orientation determiner 365 (for example, an electronic compass or 3-axis accelerometer) coupled to the controller 320, a memory 370 coupled to the controller 320, a location determiner 375 coupled to the controller 320, a network interface 380 coupled to the controller 320, and a charging pad interface 395 coupled to the controller 320 and the battery 390. The battery 390 can be coupled to all of the electrical components within the user device 110 that need power for operation. The antennas 355a-e can be positioned proximate to a front, back, and sides of the user device 110 and comprise an antenna array. The charging pad interface 395 can comprise a user device 110 secondary coil 397 to receive power and/or data from the charging pad 140.

The user devices 110 can be a portable wireless communication device, such as a wireless terminal, a smart phone, a flip phone, a personal digital assistant, a personal computer, a laptop computer, a tablet computer, or any other user device 110 that can apply beamforming for communicating with the wireless nodes 120 and be coupled to a charging pad 140 for charging the battery 390. The battery 390 can consist of one or more chemistries (for example, lead acid, Ni-MH, Ni-CAD, Li, Li-ion, and/or any other chemistry that can provide power to the user device 110), and/or one or more physical constructions (for example, button cell, cylindrical, rolled, prismatic, folded, and/or any other construction that may provide for packing considerations).

The display 340 can be a viewfinder, a liquid crystal display (LCD), a light emitting diode (LED) display, a plasma display, a projection display, a touch screen, or any other device that displays information. The transceiver 350 can include a transmitter and/or a receiver. The transceiver 350 can establish communications with the wireless nodes 120 and the local wireless network 260 via the plurality of antennas 355a-e.

The audio input and output circuitry 330 can include a microphone, a speaker, a transducer, or any other audio input and output circuitry. The user interface 360 can include a keypad, a keyboard, buttons, a touch pad, a joystick, a touch screen display, another additional display, or any other device useful for providing an interface between a user and an electronic device. The network interface 380 can be a universal serial bus port, an Ethernet port, an infrared transmitter/receiver, an IEEE 1394 port, a WLAN transceiver, or any other interface that can connect an apparatus to a network or computer and that can transmit and receive data communication signals. The memory 370 can include a random access memory, a read only memory, an optical memory, a flash memory, a removable memory, a hard drive, a cache, or any other memory that can be coupled to the user device 110.

The user device 110 or the controller 320 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 370 or elsewhere on the user device 110. The user device 110 or the controller 320 may also use hardware to implement disclosed operations. For example, the controller 320 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 320 may be any controller or processor device or devices capable of operating an electronic device and implementing the disclosed embodiments.

The network interface 380 can be a wired communication interface, such as a universal serial bus interface, a serial wired interface, a parallel wired interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces.

The charging pad interface 395 can wirelessly receive inductive power from the charging pad 140. The charging pad interface 395 can control charging of the battery 390 with the inductive power received from the charging pad 140. The charging pad interface 395 can receive a unique identifier associated with a particular charging pad 140 and/or a unique identifier associated with a particular user device 110. The user device 110 can establish data communications with the LAN 250 via the charging pad interface 395.

The controller 320 can receive, via the charging pad interface 395, a unique identifier associated with the particular charging pad 140. The controller 320 can determine when the charging pad interface 395 is coupled to the charging pad 140 either from the power being received or from the received unique identifier associated with the particular charging pad 140. The controller 320 can activate and deactivate one or more of the plurality of antennas 355a-e based on the received unique identifier and/or determining that the charging pad interface 395 is receiving inductive power.

The controller 320 can change a configuration of one or more of the antennas 355a-e when the charging pad interface 395 detects that the user device 110 is initially coupled to the charging pad 140. The configuration change can include the controller 320 deactivating one or more of the antennas 355a-e that are not to be used and for applying beamforming when communicating with the wireless node 120. The controller 320 can applying beamforming to one or more of the antennas 355a-e based on a location of the user device 110, an orientation of the user device 110, and the location of the wireless node 120. The controller 320 can determine a location of the user device 110 via the location determiner 375 (for example, a GPS receiver). Alternately, the controller 320 can receive a location of the charging pad 140 from the GIS database 210. The controller 320 can receive a location of the wireless node 120 via the transceiver 350 or charging pad interface 395. The controller 320 can deactivate one or more of the antennas 355a-e that are pointing away from the wireless node 120 and cannot provide useful communications with the wireless node 120 when the controller 320 detects that the user device 110 has been placed on the charging pad 140.

One or more of the antennas 355a-e proximate to a back of the user device 110 can be become minimally useful having poor performance in communicating with the wireless node 120 when the user device 110 has been placed on the charging pad 140. The controller 320 can deactivate one or more of the antennas 355a-e that are proximate to a back of the user device 110 when the controller 320 detects that the user device 110 has been placed on the charging pad 140. In one or more embodiments, deactivation of one or more of the antennas 355a-e can be part of an antenna 355 redundancy selection algorithm. Deactivating one or more of the antennas 355a-e allows the user device 110 to save power by not having to monitor the deactivated one or more of the antennas 355a-e, with the user device 110 only monitoring remaining non-deactivated antennas 355.

The controller 320 can deactivate one or more of the antennas 355a-e that are not used for beamforming with the wireless node 120 based on an orientation of the user device 110. The controller 320 can determine an orientation of the user device 110 via the orientation determiner 365. The controller 320 can deactivate one or more of the antennas 355a-e based on the determined orientation. For example, the controller 320 can deactivate one or more of the antennas 355a-e that are pointing away from the wireless node 120 and are not to be used for beamforming with the wireless node 120 when the controller 320 detects, via the charging pad interface 395, that the user device 110 has been placed on the charging pad 140.

In one or more embodiments, the controller 320 can disable the plurality of antennas 355a-e when the user device 110 is placed on the charging pad 140. The controller 320 can disable the plurality of antennas 355a-e when the charging pad interface 395 detects that the user device 110 has been placed on the charging pad 140. The controller 320 can switch to communicating, via the charging pad 140, with the LAN 250 when the controller 320 detects that the user device 110 has been placed on the charging pad 140.

The controller 320 can switch to communicating with a local wireless network 260 (for example, WiGig, 802.11xx, or any other local wireless network) when the user device 110 is placed on the charging pad 140. The controller 320 can switch the transceiver 350 to communicate with the local wireless network 260. The controller 320 can reconfigure the plurality of antennas 355a-e to communicate with the local wireless network 260 when the charging pad interface 395 detects that the user device 110 has been placed on the charging pad 140.

Figure 4:
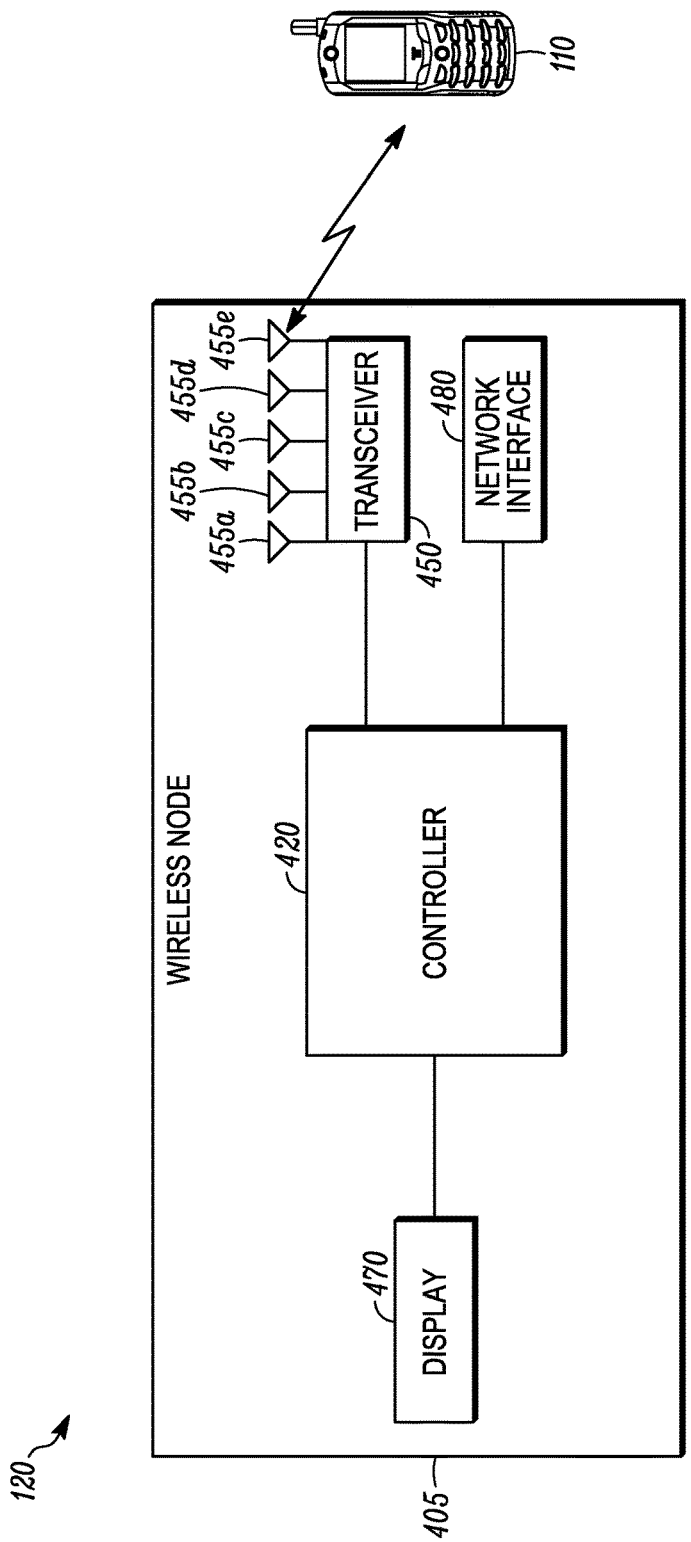
FIG. 4 illustrates a block diagram of an example wireless node, according to one or more embodiments.

FIG. 4 illustrates a block diagram of an example wireless node 120, according to one or more embodiments. The wireless node 120 can include a housing 405, a controller 420, a memory 470 coupled to the controller 420, a transceiver 450 coupled to the controller 420, and a network interface 480 coupled to the controller 420. The transceiver 450 can be coupled to a plurality of antennas 455a-e that can comprise an antenna array for communicating with the user device 110.

The wireless node 120 can be a base station, a cellular base station, a NodeB, an eNodeB, a wireless local area network access point, or any other device that can communicate with the user device 110 using antennas 455. The wireless node 120 can support Orthogonal Frequency-Division Multiple Access (OFMDA) protocol, single-carrier FDMA (SC-FDMA) protocol, or any other protocol to communicate with the user devices 110 using a plurality of antennas 455a-e applying beamforming. The network interface 480 can be a universal serial bus port, an Ethernet port, an infrared transmitter/receiver, an IEEE 1394 port, a WLAN transceiver, or any other interface that can connect an apparatus to a network or computer and that can transmit and receive data communication signals. The memory 470 can include a random access memory, a read only memory, an optical memory, a flash memory, a removable memory, a hard drive, a cache, or any other memory that can be coupled to the wireless node 120. The transceiver 450 can establish communications with the user device 110 via the plurality of antennas 455a-e.

The wireless node 120 or the controller 420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 470 or elsewhere on the wireless node 120. The wireless node 120 or the controller 420 may also use hardware to implement disclosed operations. For example, the controller 420 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an electronic device and implementing the disclosed embodiments.

The network interface 480 can be a wired communication interface, such as a universal serial bus interface, a serial wired interface, a parallel wired interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces.

The controller 420 can change a configuration of one or more of the antennas 455a-e when the user device 110 is coupled to the charging pad 140. The controller 420 can deactivate one or more of the antennas 455a-e that are not used for beamforming when communicating with the user device 110. The controller 420 can apply beamforming to one or more of the antennas 455a-e based on a location of the user device 110 or a location of the charging pad 140, and the location of the wireless node 120. The controller 420 can apply beamforming when initially establishing communications with the user device 110 to eliminate having to perform an undirected initial scan to determine a location of the user device 110.

Figure 5:
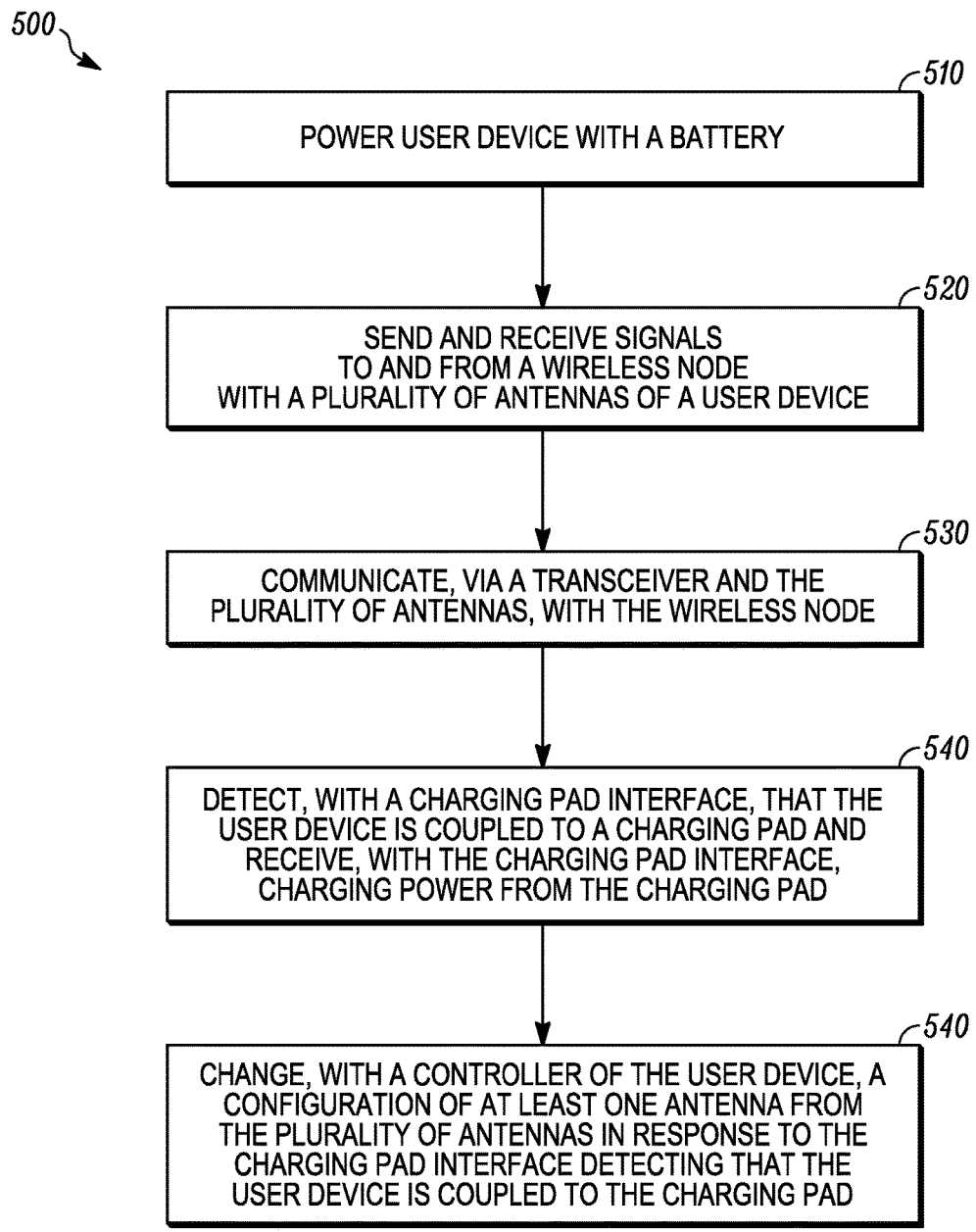
FIG. 5 illustrates a flowchart of an example method of configuring one or more antennas of a user device, according to one or more embodiments.

FIG. 5 illustrates a flowchart of an example method 500 of configuring one or more antennas 355a-e of the user device 110, according to one or more embodiments At block 510, the method 500 can begin by powering the user device 110 with the battery 390. Block 510 can proceed to block 520.

At block 520, the method 500 can send and receive, via the plurality of antennas 355a-e, signals to and from the wireless node 120. Block 520 can proceed to block 530.

At block 530, the method 500 can communicate, via the transceiver 350 and the plurality of antennas 355a-e, with the wireless node 120. Block 530 can proceed to block 540.

At block 540, the method 500 can detect, with a charging pad interface 395, that the user device 110 is coupled to a charging pad 140 and receiving charging power from the charging pad 140. Block 540 can proceed to block 550.

At block 550, the method 500 can change, with the controller 320, a configuration of at least one antenna 355 from the plurality of antennas 355a-e when the charging pad interface 395 detects that the user device 110 is coupled to the charging pad 140. The configuration change of the at least one antenna 355a-e can include disabling at least one antenna 355 from the plurality of antennas 355a-e and applying beamforming to the plurality of antennas 355a-e. The configuration change can be applied to the user device 110 when the user device 110 is coupled to a charging pad 140.

Figure 6:
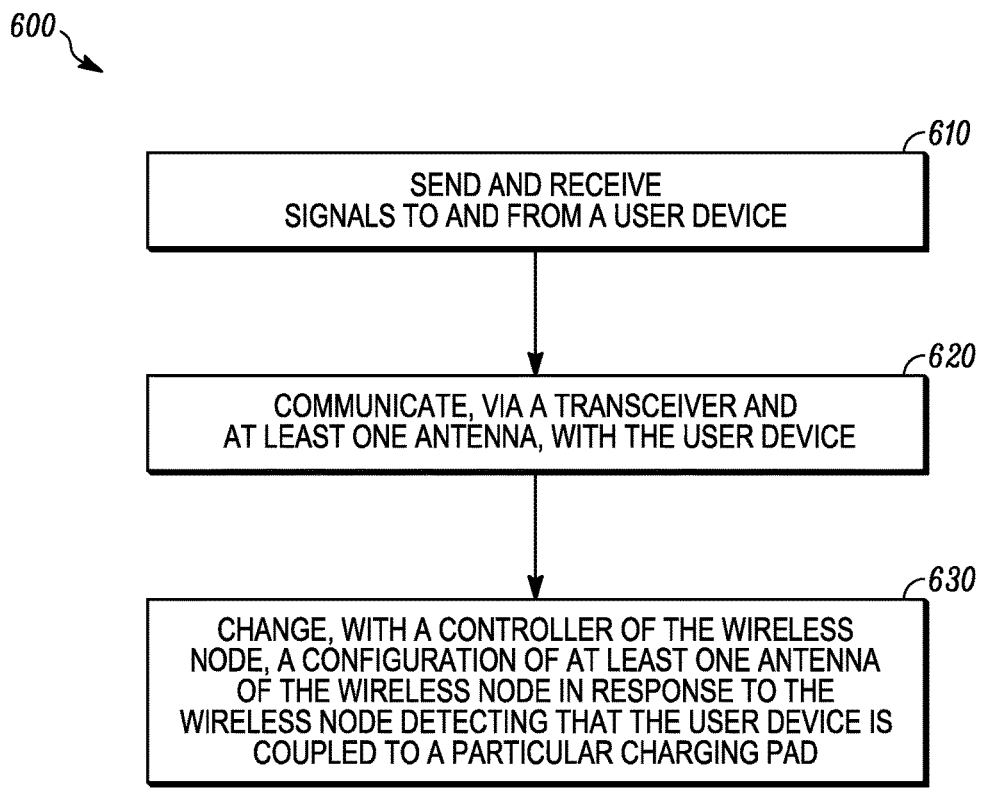
FIG. 6 illustrates a flowchart of an example method of configuring one or more antennas of a wireless node, according to one or more embodiments.

FIG. 6 illustrates a flowchart of an example method 600 of configuring one or more antennas 455a-e of the wireless node 120, according to one or more embodiments.

At block 610, the method 600 can begin by sending and receiving, via the plurality of antennas 455*a-e* of the wireless node 120, signals to and from a user device 110.

At block 620, the method 600 can communicate, via the transceiver 450 and the plurality of antennas 455*a-e*, with the user device 110.

At block 630, the method 600 can change a configuration of at least one antenna 455 from the plurality of antennas 455*a-e* when the wireless node 120 detects that the user device 110 is coupled to a particular charging pad 140. The configuration change of the at least one antenna 455*a-e* can include disabling at least one antenna 455 from the plurality of antennas 455*a-e* and applying beamforming to the plurality of antennas 455*a-e*. The configuration change can be applied to the wireless node 120 when the wireless node 120 detects that the user device 110 is coupled to the charging pad 140.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus, comprising:
   a battery that powers the apparatus;
   a plurality of antennas that send and receive signals to and from an externally deployed wireless area network node using mmWave bands;
   a transceiver that communicates, via the plurality of antennas, with the externally deployed wireless area network node using mmWave bands;
   a charging pad interface that detects that the apparatus is coupled to a charging pad and receive charging power from the charging pad; and
   a controller that obtains a location of the externally deployed wireless area network node and changes a configuration of at least one antenna from the plurality of antennas based on the obtained location and in response to the charging pad interface detecting that the apparatus is coupled to the charging pad,
   wherein the controller changes the configuration of the at least one antenna from the plurality of antennas by applying beamforming to the at least one antenna from the plurality of antennas to communicate with the externally deployed wireless area network node based on the obtained location of the externally deployed wireless area network node and in response to the charging pad interface detecting that the apparatus is coupled to the charging pad.

2. The apparatus according to claim 1, wherein the controller changes the configuration of the at least one antenna from the plurality of antennas by disabling the at least one antenna from the plurality of antennas in response to the charging pad interface detecting that the apparatus is coupled to the charging pad.

3. The apparatus according to claim 1, wherein the controller changes the configuration of the at least one antenna from the plurality of antennas by switching from communicating with the externally deployed wireless area network node to communicate with a local communication network in response to the charging pad interface detecting that the apparatus is coupled to the charging pad.

4. The apparatus according to claim 3, wherein the controller communicates with the local communication network via the charging pad.

5. The apparatus according to claim 1, further comprising:
   a digital compass that determines an orientation of the apparatus when the apparatus is coupled to the charging pad,
   wherein the controller changes the configuration of the at least one antenna from the plurality of antennas by disabling the at least one antenna and applying beamforming to at least one remaining antenna based on the orientation of the apparatus when the apparatus is coupled to the charging pad.

6. The apparatus according to claim 1, wherein the controller applies initial beamforming, when the apparatus is coupled to the charging pad, to the at least one antenna from the plurality of antennas to communicate with the externally deployed wireless area network node based a unique identifier associated with the charging pad and wherein the location is an a priori location of the externally deployed wireless area network node.

7. The apparatus according to claim 1, wherein the charging pad interface receives a charging pad unique identifier from the charging pad and associated with the charging pad, and
wherein the transceiver applies beamforming to the at least one antenna to communicate with the externally deployed wireless area network node based on the charging pad unique identifier.

8. The apparatus according to claim 1, wherein the apparatus is a portable wireless communication device.

9. The apparatus according to claim 1, wherein the externally deployed wireless area network node comprises a base station.

10. A method, comprising:
powering an apparatus with a battery;
sending and receiving, via a plurality of antennas, signals to and from an externally deployed wireless area network node using mmWave bands;
communicating, via a transceiver and the plurality of antennas, with the externally deployed wireless area network node;
detecting, with a charging pad interface, that the apparatus is coupled to a charging pad and receiving charging power from the charging pad;
obtaining, with a controller, a location of the externally deployed wireless area network node; and
changing, with the controller, a configuration of at least one antenna from the plurality of antennas based on the obtained location of the externally deployed wireless area network node and in response to the charging pad interface detecting that the apparatus is coupled to the charging pad,
wherein the change in the configuration, by the controller, of the at least one antenna from the plurality of antennas includes applying beamforming to the at least one antenna to communicate with the externally deployed wireless area network node based on the obtained location of the externally deployed wireless area network node and in response to the charging pad interface detecting that the apparatus is coupled to the charging pad.

11. The method according to claim 10, wherein the change in the configuration, by the controller, of the at least one antenna from the plurality of antennas includes disabling the at least one antenna in response to the charging pad interface detecting that the apparatus is coupled to the charging pad.

12. The method according to claim 10, wherein the change in the configuration, by the controller, of the at least one antenna from the plurality of antennas includes switching from communicating with the externally deployed wireless area network node to communicating with a local communication network in response to the charging pad interface detecting that the apparatus is coupled to the charging pad.

13. The method according to claim 12, further comprising communicating, with the controller, with the local communication network via the charging pad.

14. The method according to claim 10, further comprising:
determining, with a digital compass, an orientation of the apparatus when the apparatus is coupled to the charging pad,
wherein the change in the configuration, by the controller, of the at least one antenna from the plurality of antennas includes disabling the at least one antenna from the plurality of antennas and applying beamforming to at least one remaining antenna based on the orientation of the apparatus when the apparatus is coupled to the charging pad.

15. The method according to claim 10, further comprising applying, with the controller, initial beamforming, when the apparatus is coupled to the charging pad, to the at least one antenna from the plurality of antennas to communicate with the externally deployed wireless area network node based a unique identifier associated with the charging pad, wherein the location is an a priori location of the externally deployed wireless area network node.

16. The method according to claim 10, further comprising:
receiving, with the charging pad interface, a charging pad unique identifier from the charging pad and associated with the charging pad; and
applying beamforming, with the transceiver, to the at least one antenna from the plurality of antennas to communicate with the externally deployed wireless area network node based on the charging pad unique identifier.

17. The method according to claim 10, wherein the externally deployed wireless area network node comprises a base station.

18. An apparatus, comprising:
a plurality of antennas that send and receive signals to and from a user device using mmWave bands;
a wireless area network transceiver that communicates, via the plurality of antennas, with the user device using mmWave bands; and
a controller that obtains a location of the externally deployed wireless area network node and changes a configuration of at least one antenna from the plurality of antennas based on the obtained location and in response to the apparatus detecting that the user device is coupled to a charging pad,
wherein the controller changes the configuration of the at least one antenna from the plurality of antennas by applying beamforming to the at least one antenna to communicate with the user device based on the obtained location of the externally deployed wireless area network node and in response to the apparatus detecting that the user device is coupled to the charging pad.

19. The apparatus according to claim 18, wherein the wireless area network transceiver receives a geographic location of the charging pad, and
wherein the controller at least one of optimizes selection of at least one wireless node to service the user device and reduces a paging block size based on the geographic location of the charging pad.

20. The apparatus according to claim 18, wherein the apparatus determines a location of the user device in response to the apparatus detecting that the user device is coupled to the charging pad.

21. The apparatus according to claim 18, wherein the controller determines a plurality of weights that are applied to beamforming when the wireless area network transceiver communicates with the user device and in response to the apparatus detecting that the user device is coupled to the charging pad, and
wherein the controller determines the location of the user device from the determined plurality of weights that are applied to beamforming when the wireless area network transceiver communicates with the user device and from previously determined additional plurality of weights that are applied to beamforming when the wireless area network transceiver previously communicated with other user devices.

22. The apparatus according to claim 18, wherein the controller applies initial beamforming, when the user device is coupled to the charging pad, to the at least one antenna from the plurality of antennas based a unique identifier associated with an a priori location of the charging pad.

23. The apparatus according to claim 18, wherein the apparatus comprises a base station.

\* \* \* \* \*